(12) United States Patent  (10) Patent No.: US 8,908,112 B2
Ikeda et al.  (45) Date of Patent: Dec. 9, 2014

(54) DISPLAY PANEL, DISPLAY DEVICE, AND ELECTRONIC UNIT

(75) Inventors: Kojiro Ikeda, Tottori (JP); Toshinori Uehara, Tottori (JP); Hideki Kaneko, Tottori (JP); Daichi Suzuki, Tottori (JP)

(73) Assignee: Japan Display West Inc., Aichi (JP)

( * ) Notice: Subject to any disclaimer, the term of this patent is extended or adjusted under 35 U.S.C. 154(b) by 90 days.

(21) Appl. No.: 13/440,511

(22) Filed: Apr. 5, 2012

(65) Prior Publication Data

US 2012/0262637 A1  Oct. 18, 2012

(30) Foreign Application Priority Data

Apr. 12, 2011  (JP) ................................. 2011-087914

(51) Int. Cl.
  *G02F 1/1335*  (2006.01)
  *G02B 27/22*  (2006.01)
  *G02F 1/1333*  (2006.01)

(52) U.S. Cl.
  CPC  *G02B 27/2214* (2013.01); *G02F 2001/133311* (2013.01); *G02F 1/133512* (2013.01); *H04N 2213/001* (2013.01)
  USPC .......................................................... 349/15

(58) Field of Classification Search
  USPC .......................................................... 349/15
  See application file for complete search history.

(56) References Cited

U.S. PATENT DOCUMENTS

| 2009/0185088 A1* | 7/2009 | Shinohara | 349/12 |
| 2010/0283924 A1* | 11/2010 | Lee et al. | 349/15 |
| 2011/0199549 A1* | 8/2011 | Washizawa | 349/15 |

FOREIGN PATENT DOCUMENTS

| JP | 08-106070 | 4/1996 |
| JP | 1997-090391 | 4/1997 |
| JP | 1997-1059198 | 4/1997 |
| JP | 09-281440 | 10/1997 |
| JP | 2001-051263 | 2/2001 |
| JP | 2003-186041 | 7/2003 |
| JP | 2004-264760 | 9/2004 |
| JP | 2005-173066 | 6/2005 |
| JP | 2008-064918 | 3/2008 |
| JP | 2008-176167 | 7/2008 |
| JP | 2010-108808 | 5/2010 |
| JP | 2010-204406 | 9/2010 |
| JP | 2011-028074 | 2/2011 |

OTHER PUBLICATIONS

Japanese Office Action dated Jun. 10, 2014, issued in connection with counterpart Japanese Patent Application No. 2011-087914.

* cited by examiner

*Primary Examiner* — Wen-Ying P Chen
(74) *Attorney, Agent, or Firm* — Dentons US LLP

(57) ABSTRACT

There are provided a display panel being both anti-static and resistant to corrosion, a display device provided with the display panel, and an electronic unit provided with the display device. The display panel includes a panel section including a plurality of pixels arranged in a matrix; a barrier layer provided at an upper or lower part of the panel section, and the barrier layer including light-shielding regions and transmissive regions that are arranged systematically; and a transparent conductive layer provided at the upper part of the panel section.

17 Claims, 7 Drawing Sheets

DISPLAY PANEL, DISPLAY DEVICE, AND ELECTRONIC UNIT

BACKGROUND

The present disclosure relates to a display panel capable of multi-view display allowing viewing of two-dimensional (2D) image (planar image) that looks different depending on from which perspective the image is viewed, or capable of three-dimensional (3D) display allowing viewing of 3D image (stereoscopic image) from a specific perspective, and to a display device provided with such a display panel. The present disclosure also relates to an electronic unit provided with the display device as above.

SUMMARY

A display device capable of multi-view display or 3D display has been recently in practical use. Such a display device is known to include a barrier layer on the display region of a display panel, for example. As an exemplary barrier layer, Japanese Unexamined Patent Application Publication No. 9-281440 describes a barrier layer including a plurality of transmissive slits each separated by a light-shielding region. As another example, Japanese Unexamined Patent Application Publication No. 8-106070 describes a barrier liquid crystal display with which a light-shielding region is generated in response to application of a voltage to a liquid crystal material.

The issue here is that the display panel as above shows display anomalies in some cases upon application of a high electric potential such as static electricity from the outside. This disadvantage becomes apparent especially when the display panel includes electrodes only on one of substrates because this easily leads to accumulation of electric charge, e.g., static electricity, on the remaining substrate side. As a measure therefor, Japanese Unexamined Patent Application Publication No. 2010-204406 describes an approach to configure a barrier layer by metal to provide the resulting barrier layer with the capability of shielding against static electricity.

However, configuring the barrier layer by metal as such results in a disadvantage of corrosion thereof if any water enters into the display panel from the outside environment. Japanese Unexamined Patent Application Publication No. 2010-204406 describes in Example that a glass substrate is provided directly above the barrier layer. Water thus indeed hardly comes from the glass substrate side, but may come from the side surface of the display panel and may cause corrosion of the barrier layer.

It is thus desirable to provide a display panel being both anti-static and resistant to corrosion, a display device provided with the display panel, and an electronic unit provided with the display device.

A display panel according to an embodiment of the present disclosure includes a panel section, a barrier layer, and a transparent conductive layer. The panel section includes a plurality of pixels arranged in a matrix. The barrier layer is provided at an upper or lower part of the panel section, and includes a light-shielding region and transmissive regions that are arranged systematically. The transparent conductive layer is provided at the upper part of the panel section.

A display device according to another embodiment of the present disclosure includes a display panel, and a chassis supporting the display panel. The display panel includes a panel section including a plurality of pixels arranged in a matrix; a barrier layer provided at an upper or lower part of the panel section, and the barrier layer including light-shielding regions and transmissive regions that are arranged systematically; and a transparent conductive layer provided at the upper part of the panel section.

An electronic unit according to still another embodiment of the present disclosure includes a display device including a display panel and a chassis supporting the display panel. The display panel includes a panel section including a plurality of pixels arranged in a matrix; a barrier layer provided at an upper or lower part of the panel section, and the barrier layer including light-shielding regions and transmissive regions that are arranged systematically; and a transparent conductive layer provided at the upper part of the panel section.

In the display panel, the display device, and the electronic unit according to the embodiments of the present disclosure, separately from the barrier layer, the transparent conductive layer is provided at the upper portion of the panel section. This configuration allows to select each suitable material for the barrier layer and for the transparent conductive layer, thereby being able to provide the resistance to corrosion by water to each of the barrier layer and the transparent conductive layer.

According to the embodiments of the present disclosure, the display panel may be additionally provided with a conductor electrically connecting together the transparent conductive layer and a conductive member. When the display panel is provided with the conductor as such, the panel section may be provided with a first substrate including the conductive member, or the display panel may include the conductive member at the upper-surface end portion thereof.

According to the embodiments of the present disclosure, the transparent conductive layer is an adhesive layer, for example. When the transparent conductive layer is an adhesive layer as such, the display panel may be provided with a polarizing plate being in contact with the transparent conductive layer, and the panel section may include a liquid crystal layer. Also when the transparent conductive layer is an adhesive layer, the display panel may be provided with a transparent substrate being in contact with the transparent conductive layer, and the panel section may include a light-emitting layer.

According to the embodiments of the present disclosure, the display panel may include a substrate between the transparent conductive layer and the panel section, and the transparent conductive layer may be an anti-reflection layer. Herein, the substrate may be a polarizing plate or a transparent substrate.

In the display panel, the display device, and the electronic unit according to the embodiments of the present disclosure, the transparent conductive layer is provided at the upper portion of the panel section separately from the barrier layer, thereby being able to provide the resistance to corrosion by water to each of the barrier layer and the transparent conductive layer. This accordingly prevents the resulting structure from being electrically charged and corrosive.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENTS

In the below, embodiments of the present disclosure are described in detail by referring to the accompanying drawings. Herein, a description is given in the following order.

1. First Embodiment (Liquid Crystal Display Device)
2. Second Embodiment (Organic EL (Electro-Luminescence) Display Device)
3. Application Example (Electronic Unit)
(1. First Embodiment)
(Configuration)

Figure 1:
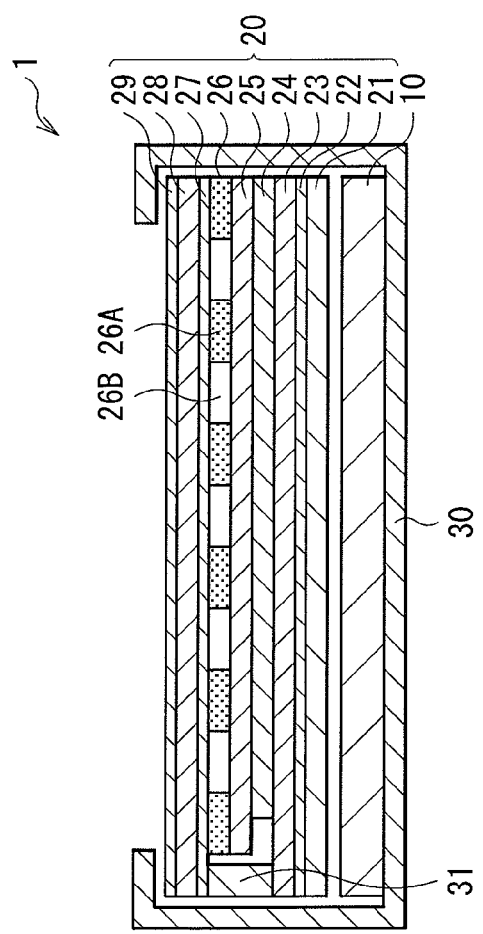
FIG. 1 is a view of a display device in a first embodiment, showing an exemplary cross-sectional configuration thereof.

FIG. 1 is a view of a display device 1 of a first embodiment, showing an exemplary cross-sectional configuration thereof. Note that FIG. 1 is a schematic view, and the dimension and shape thereof are not necessarily the same as those in reality. The display device 1 is configured to include a display panel 20, a backlight 10, and a chassis 30. The backlight 10 is disposed behind the display panel 20, and the chassis 30 supports the display panel 20 and the backlight 10.

The backlight 10 is a plane-emitting light source that illuminates the display panel 20 from the rear thereof. The upper surface of the display panel 20 serves as an image display surface, and the chassis 30 has an aperture to correspond at least to the image display surface. In the chassis 30, at least, a frame portion forming the aperture as such is made conductive, for example, and the chassis 30 including the frame portion is preferably made conductive in its entirety. Note that, in the first embodiment, the chassis 30 may be made nonconductive.

The display panel 20 is a transmissive panel in which pixels (not shown) are driven according to an image signal coming from the outside. As shown in FIG. 1, for example, the display panel 20 includes a panel section, i.e., corresponding to a panel section 40 that will be described later, including a liquid crystal layer 24 sandwiched between a pair of substrates, i.e., lower and upper substrates 23 and 25. The lower substrate 23 is a so-called TFT (Thin Film Transistor) substrate, and includes a common wiring for electrical connection with a conductor 31 that will be described later. The common wiring is the one to be at a ground potential when the display device 1 is in use. The upper substrate 25 is a so-called CF (Color Filter) substrate.

As shown in FIG. 1, for example, the display panel 20 includes an adhesive layer 22 and a polarizing plate 21 at the lower portion of the panel section, i.e., on the lower substrate 23 side. The polarizing plate 21 is fixed to the lower substrate 23 via the adhesive layer 22. The display panel 20 is provided with a barrier layer 26 at the upper portion of the panel section, i.e., on the upper substrate 25 side, as shown in FIG. 1, for example. The barrier layer 26 is formed directly on the upper surface of the upper substrate 25, for example. Alternatively, the barrier layer 26 may be configured by a glass substrate (not shown) formed with the barrier layer 26, and the resulting structure may be affixed onto the upper surface of the upper substrate 25. The display panel 20 is provided also with an adhesive layer 27, a polarizing plate 28, and an AR (Anti-Reflection) layer 29 as shown in FIG. 1, for example. The polarizing plate 28 is fixed to the upper substrate 25 via the adhesive layer 27. When the AR layer 29 is formed by a coating process on the polarizing plate 28, the AR layer 29 is in directly contact with the polarizing plate 28. When the AR layer 29 is made of a film, the AR layer 29 is fixed to the polarizing plate 28 via any other adhesive layer that is not shown, for example. Note that, in the embodiment, if appropriate, the AR layer 29 may not be provided.

In this embodiment, the adhesive layer 27 serves not only to fix together the polarizing plate 28 and the barrier layer 26, but also to pass light therethrough and is made conductive. The adhesive layer 27 is also resistant to corrosion by water. The adhesive layer 27 is made of an adhesive containing the needle-shaped ITO (Indium-Tin Oxide) as described in Japanese Unexamined Patent Application Publication No. 7-153313.

The display panel 20 also includes the conductor 31 as shown in FIG. 1, for example. The conductor 31 is for preventing accumulation of electric charge such as static electricity on the upper substrate 25 side of the display panel 20. In this embodiment, the conductor 31 electrically connects together the adhesive layer 27 being conductive and the common wiring on the lower substrate 23, and is configured by pillar-like metal, for example.

Figure 2:
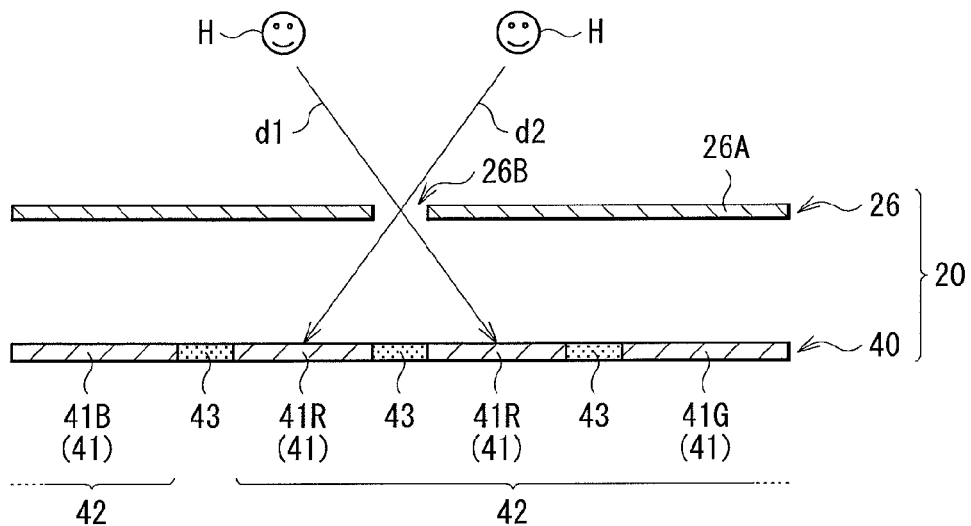
FIG. 2 is a view of a panel section and that of a barrier layer at the time of dual viewing, showing an exemplary cross-sectional configuration thereof.
Figure 3:
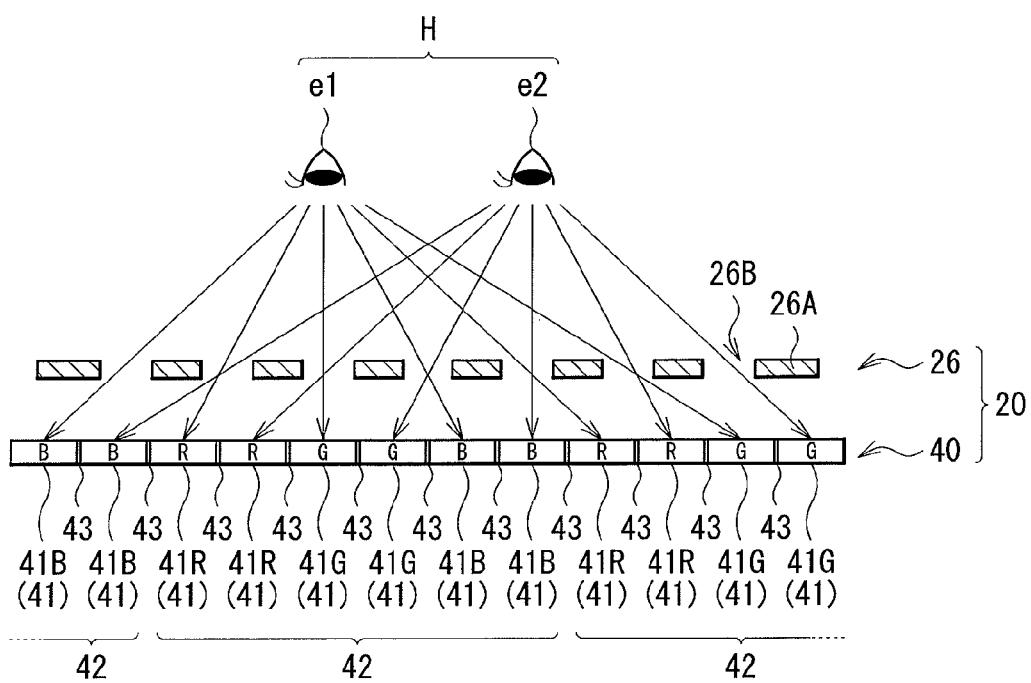
FIG. 3 is a view of the panel section and that of the barrier layer at the time of 3D display, showing an exemplary cross-sectional configuration thereof.

The display panel 20 is a display panel capable of multi-view display allowing viewing of 2D image (planar image) that looks different depending on from which perspective the image is viewed, or capable of 3D display allowing viewing of 3D image (stereoscopic image) from a specific perspective. FIG. 2 is a diagram schematically showing how multi-view display is made on the display panel 20. FIG. 3 is a diagram schematically showing how 3D display is made on the display panel 20.

The panel section 40 including the liquid crystal layer 24 sandwiched between the lower and upper substrates 23 and 25 is provided with a display region as shown in FIGS. 2 and 3, for example. The display region includes a plurality of pixels 42 arranged in a matrix. The pixels 42 are each capable of emitting light of various colors, and each include two sub-pixels 41 for each color, for example. The sub-pixels 41 are each capable of emitting light of red, green, or blue, for example. As shown in FIGS. 2 and 3, the pixels 42 are each including two sub-pixels 41R for red, two sub-pixels 41G for green, and two sub-pixels 41B for blue, for example.

The sub-pixels 41 in each of the pixels 42 as such are arranged in stripes, for example. Between the pixels 42 or between the sub-pixels 41, a black section 43 being a light-shielding section is each disposed. The black section 43 is in the shape of a grid in the plane, for example.

The barrier layer 26 is for shielding a part of the light (image light) coming from each of the pixels 42 of the panel section 40. At the time of dual-view display, the barrier layer 26 shields a part of the pixels 42, thereby allowing viewing of 2D image (planar image) that looks different depending on from which appropriate-viewing direction a viewer H looks, i.e., direction d1 or d2 that will be described later (see FIG. 2). At this time, the display device 1 operates as a so-called dual-view display device. At the time of 3D display, the barrier layer 26 shields a part of the pixels 42, thereby allowing viewing of 2D image (planar image) that looks different between right and left eyes e1 and e2 (see FIG. 3) of the viewer H. At this time, the display device 1 operates as a so-called 3D display device.

As shown in FIGS. 2 and 3, for example, the barrier layer 26 is disposed at the position opposing to the panel section 40. The barrier layer 26 is in such a barrier pattern as exemplarily shown in FIGS. 2 and 3, i.e., a barrier pattern of including a plurality of transmissive regions 26B that are arranged two-dimensionally, and including a light-shielding region 26A around each of the transmissive regions 26B.

The barrier layer 26 is resistant to corrosion by water. The light-shielding regions 26A are each configured by a light-shielding member, for example. Such a light-shielding member is exemplified by a resin containing a black pigment or others. On the other hand, the transmissive regions 26B are each an aperture. The transmissive regions 26B as such are arranged systematically, and are arranged two-dimensionally in the row and column directions. The light-shielding regions 26A and the transmissive regions 26B are arranged in a checkered pattern, i.e., alternately in the row and column directions, for example.

At the time of dual-view display, the barrier layer 26 is so disposed as to make entirely or partially visible any predetermined sub-pixel 41 via each corresponding transmissive region 26B when the viewer H looks at the display panel 20 from the first appropriate-view direction d1 as shown in FIG. 2, for example. Also at the time of dual-view display, the barrier layer 26 is so disposed as to make entirely or partially visible any other sub-pixel 41 via each corresponding transmissive region 26B when the viewer H looks at the display panel 20 from the second appropriate-view direction d2 as shown in FIG. 2, for example. In other words, the transmissive regions 26B are each so configured as to allow entire or partial viewing of different sub-pixels 41 therethrough depending on from which appropriate-view direction, i.e., the first or second appropriate-view direction d1 or d2, the viewer H looks at the display panel 20, for example. Therefore, when looking at the display panel 20 from the first or second appropriate-view direction d1 or d2, the viewer H is allowed to view the sub-pixels 41 of three colors RGB for each of the pixels 42, for example.

At the time of 3D display, the barrier layer 26 is so disposed as to make entirely or partially visible any predetermined sub-pixel 41 via each corresponding transmissive region 26B when the viewer H looks at the display panel 20 using his or her right eye e1 as shown in FIG. 3, for example. Also at the time of 3D display, the barrier layer 26 is so disposed as to make entirely or partially visible any other sub-pixel 41 via each corresponding transmissive region 26B when the viewer H looks at the display panel 20 using his or her left eye e2 as shown in FIG. 3, for example. In other words, the transmissive regions 26B are each so configured as to allow entire or partial viewing of different sub-pixels 41 therethrough depending on which eye, i.e., the right or left eye e1 or e2, the viewer H uses to look at the display panel 20, for example. Therefore, when looking at the display panel 20 using his or her right or left eye e1 or e2, the viewer H is allowed to view the sub-pixels 41 of three colors RGB for each of the pixels 42, for example.

(Operation)

In the embodiment, light coming from the backlight 10 is modulated by each of the pixels 42 of the panel section 40, and then any predetermined image light is provided to the barrier layer 26. Thereafter, the image light is partially shielded by the light-shielding regions 26A of the barrier layer 26, and the remaining light passed through the transmissive regions 26B is emitted from the image display surface of the display panel 20. When the barrier layer 26 is in a mode for dual-view display, for example, the light emitted from the image display surface forms an image at a predetermined position (perspective) on the line segment parallel to the first appropriate-view direction d1, thereby generating 2D image (planar image). Also the light emitted from the image display surface forms an image at a predetermined position (perspective) on the line segment parallel to the second appropriate-view direction d2, thereby generating 2D image (planar image), for example. When the barrier layer 26 is in a mode for 3D display, for example, the light emitted from the image display surface forms an image at the position (perspective) of the right eye e1, thereby generating 2D image (planar image). Also the light emitted from the image display surface forms an image at the position (perspective) of the left eye e2, thereby generating 2D image (planar image), for example. As such, the viewer H is allowed to view 3D image.

(Effect)

In the embodiment, separately from the barrier layer 26, the adhesive layer 27 as a transparent conductive layer is provided at the upper portion of the panel section 40. This configuration allows to select each suitable material for the barrier layer 26 and for the adhesive layer 27, thereby providing the resistance to corrosion by water to each of the barrier layer 26 and the adhesive layer 27. As an example, in the barrier layer 26, the light-shielding regions 26A may be each made of a resin containing a black pigment or others, the transmissive regions 26B may be each formed like an aperture, and the adhesive layer 27 may be made of an adhesive containing the needle-shaped ITO described above. As such, in the embodiment, since the barrier layer 26 is not configured by a metal thin film that is highly corrosive by water, the resulting display panel 20 favorably becomes both anti-static and resistant to corrosion.

(Modifications)

(Modification 1-1)

Figure 4:
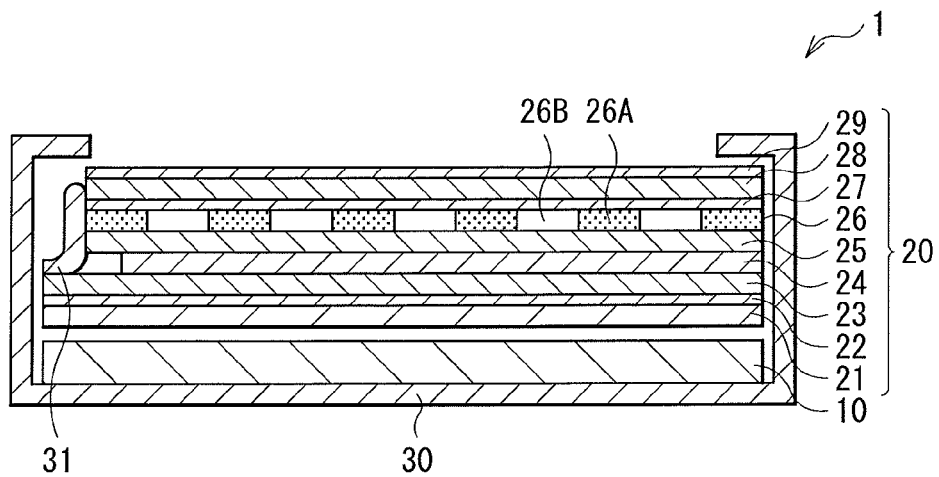
FIG. 4 is a cross-sectional view of the display device of FIG. 1 in Modification 1-1.

In the first embodiment described above, exemplified is the case where the conductor 31 is configured by the pillar-like metal, but alternatively, the conductor 31 may be made of a metal paste, for example. When the conductor 31 is made of a metal paste as such, the conductor 31 may possibly be disposed on the side surface of the display panel 20 as shown in FIG. 4, for example. If this is the configuration, the conductor 31 electrically connects together the end portion of the adhesive layer 27 and the common wiring on the lower substrate 23.

(Modification 1-2)

Figure 5:
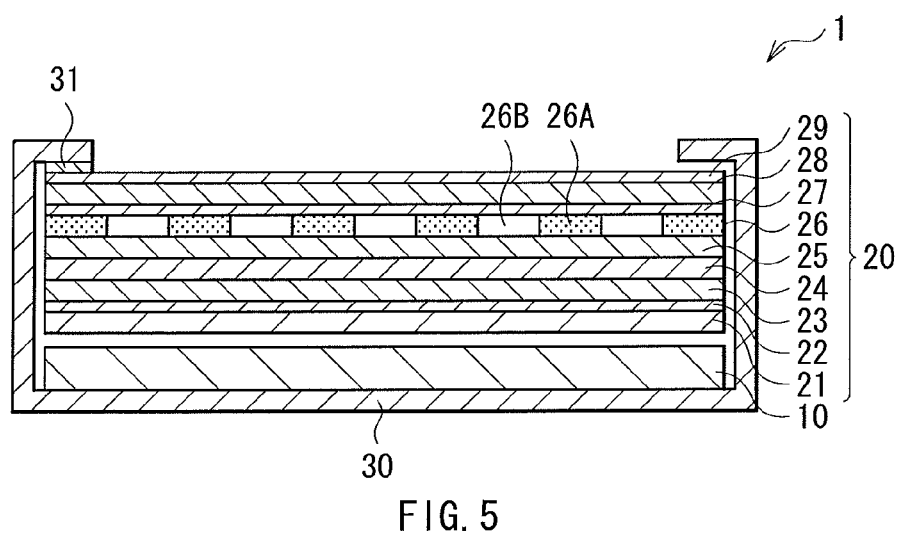
FIG. 5 is a cross-sectional view of the display device of FIG. 1 in Modification 1-2.

In the first embodiment described above, exemplified is the case where the adhesive layer 27 is made conductive, but alternatively, the AR layer 29 may be made conductive, for example. If this is the configuration, the conductor 31 is disposed at the upper-surface end portion of the display panel 20, i.e., at the upper-surface end portion of the AR layer 29, and electrically connects together the chassis 30 and the AR layer 29 as shown in FIG. 5, for example. In this case, the conductor 31 may be configured by pillar-like metal, or may be made of a metal paste. This accordingly prevents accumulation of electric charge such as static electricity on the upper substrate 25 side of the display panel 20. Accordingly, similarly to the first embodiment described above, the resulting display panel 20 successfully becomes both anti-static and resistant to corrosion.

(Modification 1-3)

Figure 6:
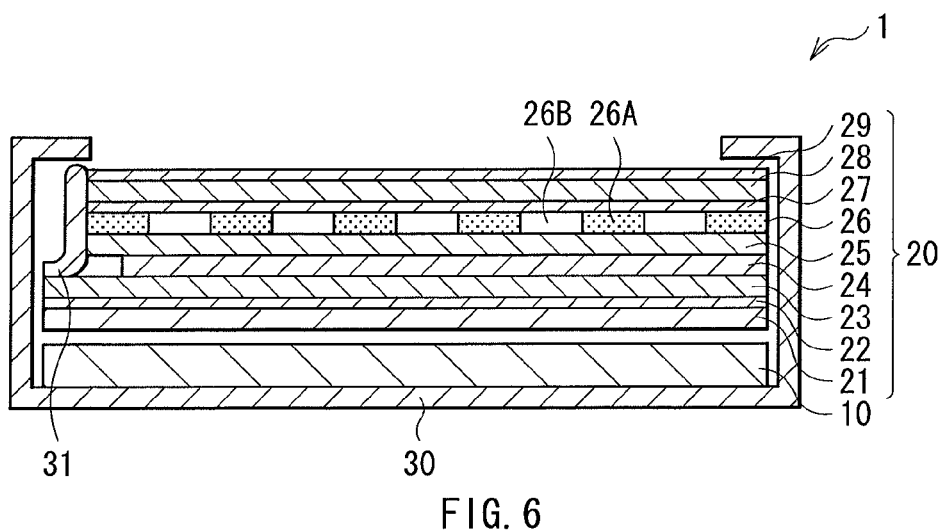
FIG. 6 is a cross-sectional view of the display device of FIG. 1 in Modification 1-3.

In Modification 1-2 described above, exemplified is the case where the conductor 31 is provided at the upper-surface end portion of the display panel 20, but alternatively, the conductor 31 may be provided on the side surface of the display panel 20 as shown in FIG. 6, for example. If this is the configuration, however, the conductor 31 is preferably made of a metal paste.

(Modification 1-4)

Figure 7:
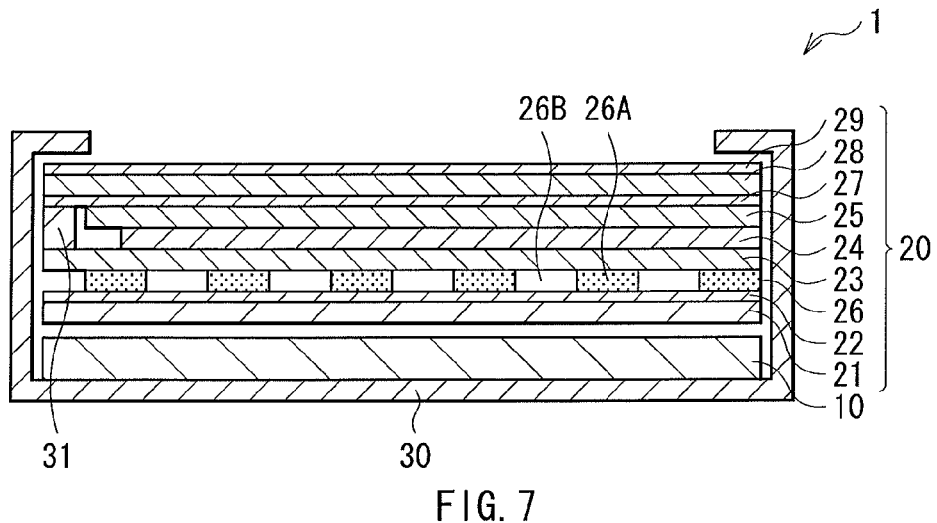
FIG. 7 is a cross-sectional view of the display device of FIG. 1 in Modification 1-4.

In the first embodiment and Modifications 1-1 to 1-3 described above, exemplified is the case where the barrier layer 26 is provided on the upper substrate 25, but alternatively, the barrier layer 26 may be provided below the lower substrate 23, for example. Specifically, the barrier layer 26 may be formed below the lower substrate 23 to be in contact therewith as shown in FIG. 7, for example.

(Modification 1-5)

Figure 8:
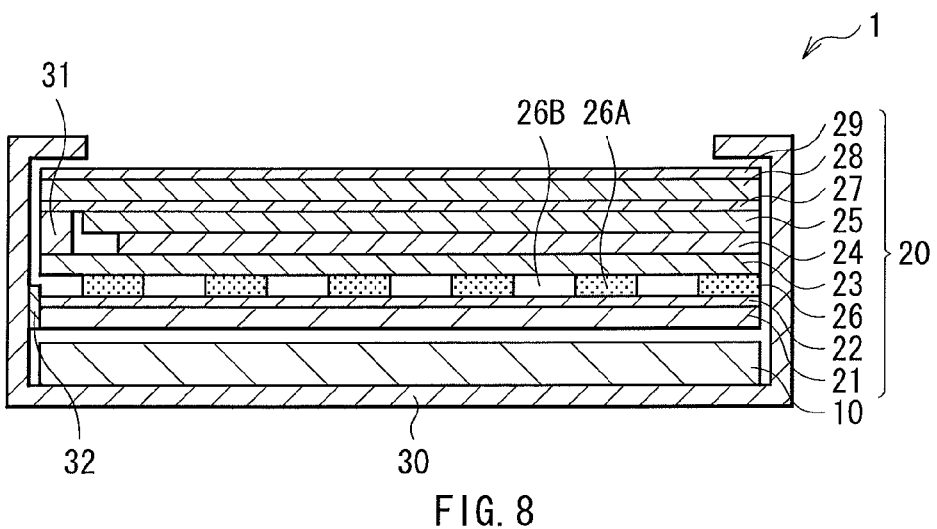
FIG. 8 is a cross-sectional view of the display device of FIG. 1 in Modification 1-5.

In the first embodiment described above, instead of including the barrier layer 26 on the upper substrate 25, when the barrier layer 26 is provided below the lower substrate 23 as shown in FIG. 8, for example, the adhesive layer 22 is preferably in the configuration similar to that of the adhesive layer 27. To be specific, the adhesive layer 22 serves not only to fix together the polarizing plate 21 and the barrier layer 26, but also to pass light therethrough and is made conductive. The adhesive layer 22 is also resistant to corrosion by water. The adhesive layer 22 is made of an adhesive containing the needle-shaped ITO as described in Japanese Unexamined Patent Application Publication No. 7-153313, for example.

In this modification, preferably, the display panel 20 is additionally provided with a conductor 32, which electrically connects together the adhesive layer 22 and the chassis 30 as shown in FIG. 8, for example. If this is the configuration, any electric charge such as static electricity is prevented from accumulating not only on the upper substrate 25 of the display panel 20 but also on the lower substrate 23 side thereof. Accordingly, similarly to the first embodiment described above, the resulting display panel 20 successfully becomes both anti-static and resistant to corrosion.

(Modification 1-6)

Figure 9:
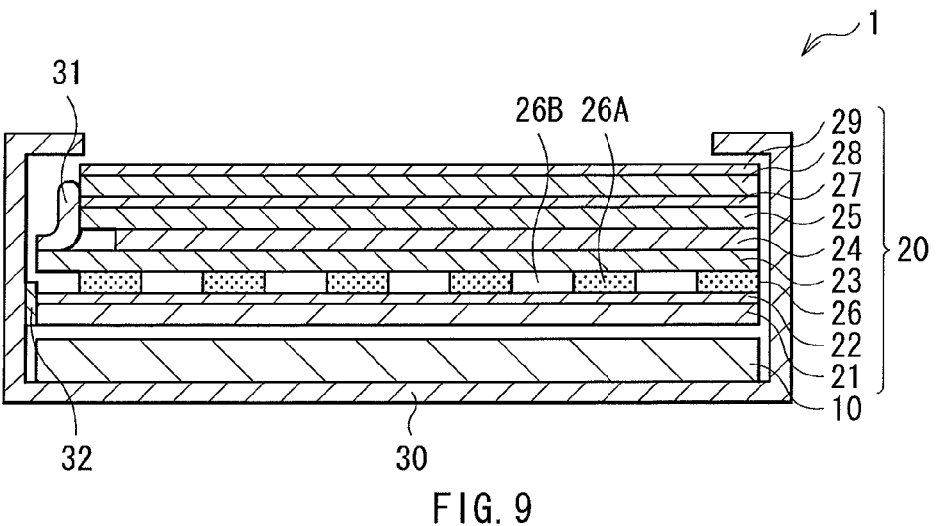
FIG. 9 is a cross-sectional view of the display device of FIG. 1 in Modification 1-6.

In Modification 1-1 described above, instead of including the barrier layer 26 on the upper substrate 25, when the barrier layer 26 is provided below the lower substrate 23 as shown in FIG. 9, for example, the adhesive layer 22 is preferably in the configuration similar to that of the adhesive layer 27. To be specific, the adhesive layer 22 serves not only to fix together the polarizing plate 21 and the barrier layer 26, but also to pass light therethrough and is made conductive. The adhesive layer 22 is also resistant to corrosion by water. The adhesive layer 22 is made of an adhesive containing the needle-shaped ITO as described in Japanese Unexamined Patent Application Publication No. 7-153313, for example.

In this modification, preferably, the display panel 20 is additionally provided with the conductor 32, which electrically connects together the adhesive layer 22 and the chassis 30 as shown in FIG. 9, for example. If this is the configuration, any electric charge such as static electricity is prevented from accumulating not only on the upper substrate 25 of the display panel 20 but also on the lower substrate 23 side thereof. Accordingly, similarly to the first embodiment described above, the resulting display panel 20 successfully becomes both anti-static and resistant to corrosion.

(Modification 1-7)

Figure 10:
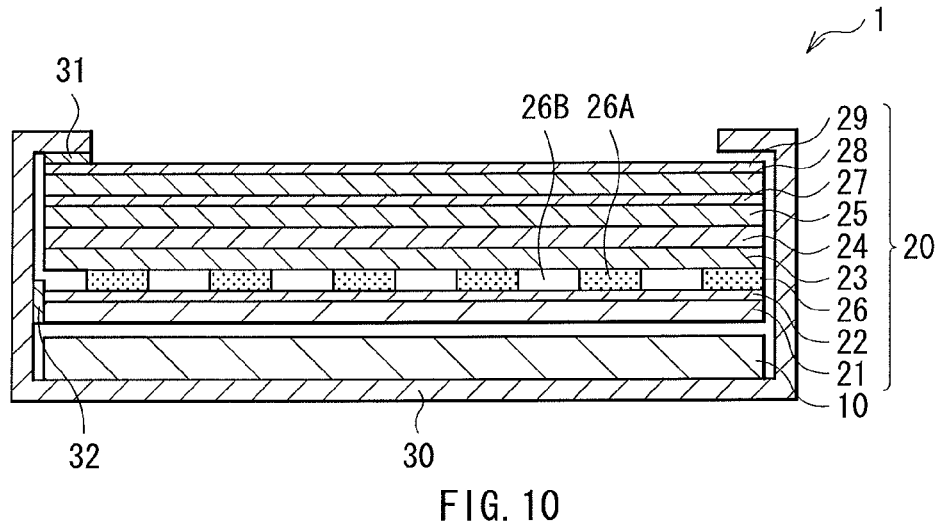
FIG. 10 is a cross-sectional view of the display device of FIG. 1 in Modification 1-7.

In Modification 1-2 described above, instead of including the barrier layer 26 on the upper substrate 25, when the barrier layer 26 is provided below the lower substrate 23 as shown in FIG. 10, for example, the adhesive layer 22 is preferably in the configuration similar to that of the adhesive layer 22 of Modification 1-6 described above.

In this modification, preferably, the display panel 20 is additionally provided with the conductor 32, which electrically connects together the adhesive layer 22 and the chassis 30 as shown in FIG. 10, for example. If this is the configuration, any electric charge such as static electricity is prevented from accumulating not only on the upper substrate 25 of the display panel 20 but also on the lower substrate 23 side thereof. Accordingly, similarly to Modification 1-2 described above, the resulting display panel 20 successfully becomes both anti-static and resistant to corrosion.

(Modification 1-8)

Figure 11:
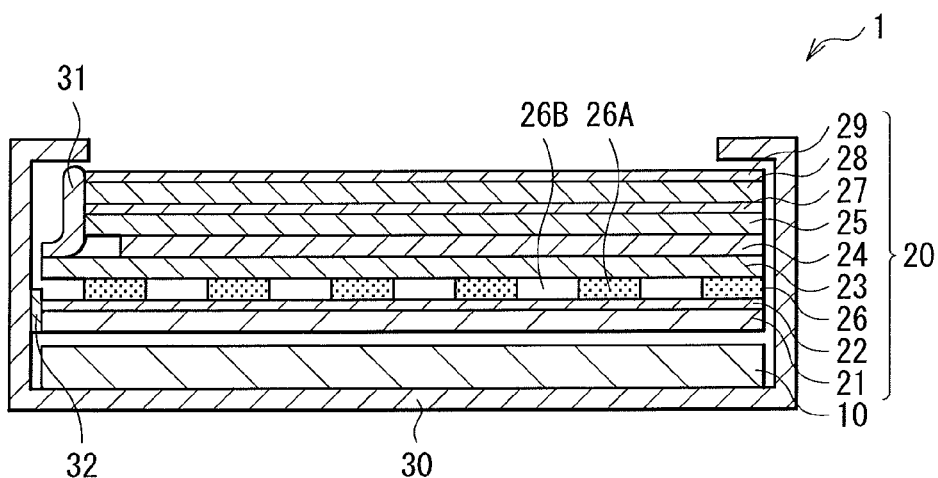
FIG. 11 is a cross-sectional view of the display device of FIG. 1 in Modification 1-8.

In Modification 1-3 described above, instead of including the barrier layer 26 on the upper substrate 25, when the barrier layer 26 is provided below the lower substrate 23 as shown in FIG. 11, for example, the adhesive layer 22 is preferably in the configuration similar to that of the adhesive layer 22 of Modification 1-6 described above.

In this modification, preferably, the display panel 20 is additionally provided with the conductor 32, which electrically connects together the adhesive layer 22 and the chassis 30 as shown in FIG. 11, for example. If this is the configuration, any electric charge such as static electricity is prevented from accumulating not only on the upper substrate 25 of the display panel 20 but also on the lower substrate 23 side thereof. Accordingly, similarly to Modification 1-3 described above, the resulting display panel 20 successfully becomes both anti-static and resistant to corrosion.

(2. Second Embodiment)
(Configuration)

Figure 12:
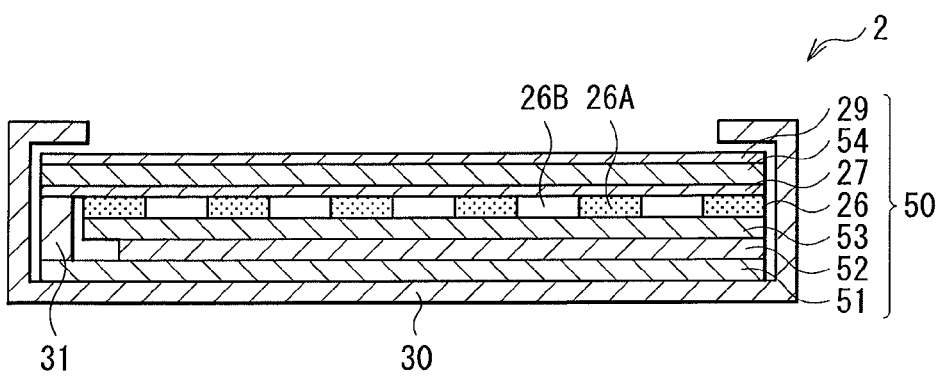
FIG. 12 is a view of a display device in a second embodiment, showing an exemplary cross-sectional configuration thereof.

FIG. 12 is a view of a display device 2 in a second embodiment, showing an exemplary cross-sectional configuration thereof. Note that FIG. 12 is a schematic view, and the dimension and shape thereof are not necessarily the same as those in reality. The display device 2 is configured to include a display panel 50, and the chassis 30 supporting the display panel 50. Herein, any structure component same as that of the first embodiment described above is provided with the same reference numeral.

The display panel 50 is a self-emitting panel in which pixels (not shown) are driven according to an image signal coming from the outside. As shown in FIG. 12, for example, the display panel 50 includes a panel section (corresponding to the panel section 40 in the first embodiment described above) including an organic EL layer 52 sandwiched between a pair of substrates, i.e., lower and upper substrates 51 and 53. The lower substrate 51 is a so-called TFT substrate, and includes a common wiring for electrical connection with the conductor 31. The common wiring is the one to be at a ground potential when the display device 2 is in use. The upper substrate 53 is a transparent substrate such as glass substrate.

As shown in FIG. 12, for example, the display panel 50 includes the barrier layer 26 at the upper portion of the panel section, i.e., on the upper substrate 53 side. The barrier layer 26 is formed directly on the upper surface of the upper substrate 53, for example. Alternatively, the barrier layer 26 may be configured by a glass substrate (not shown) formed with the barrier layer 26, and the resulting structure may be affixed onto the upper surface of the upper substrate 53. The display panel 50 is provided also with the adhesive layer 27, a support substrate 54, and the AR (Anti-Reflection) layer 29 as shown in FIG. 12, for example. The support substrate 54 is fixed to the upper substrate 53 via the adhesive layer 27, and is a glass substrate, for example. When the AR layer 29 is formed by a coating process on the support substrate 54, the AR layer 29 is in directly contact with the support substrate 54. When the AR layer 29 is made of a film, the AR layer 29 is fixed to the support substrate 54 via any other adhesive layer that is not shown, for example. Note that, in this second embodiment, if appropriate, the AR layer 29 may not be provided.

In this embodiment, the adhesive layer 27 serves not only to fix together the support substrate 54 and the barrier layer 26, but also to pass light therethrough and is made conductive. The adhesive layer 27 is also resistant to corrosion by water. Similarly to the first embodiment described above, the adhesive layer 27 is made of an adhesive containing the needle-shaped ITO (Indium-Tin Oxide) as described in Japanese Unexamined Patent Application Publication No. 7-153313.

The display panel 50 also includes the conductor 31 as shown in FIG. 12, for example. The conductor 31 is for preventing accumulation of electric charge such as static electricity on the upper substrate 53 side of the display panel 50. In this embodiment, the conductor 31 electrically connects together the adhesive layer 27 being conductive and the common wiring on the lower substrate 51, and is configured by pillar-like metal, for example.

The display panel 50 is a display panel capable of multi-view display or 3D display similarly to the display panel 20 in the first embodiment described above.

The panel section 40 including the organic EL layer 52 sandwiched between the lower and upper substrates 51 and 52 is provided with a display region as shown in FIGS. 2 and 3, for example. The display region includes a plurality of pixels 42 arranged in a matrix.

The barrier layer 26 is for shielding a part of the light (image light) coming from each of the pixels 42 of the panel section 40. At the time of dual-view display, the barrier layer 26 shields a part of the pixels 42, thereby allowing viewing of 2D image (planar image) that looks different depending on from which appropriate-viewing direction the viewer H looks, i.e., the direction d1 or d2 that will be described later (see FIG. 2). At this time, the display device 2 operates as a so-called dual-view display device. At the time of 3D display, the barrier layer 26 shields a part of the pixels 42, thereby allowing viewing of 2D image (planar image) that looks different between the right and left eyes e1 and e2 (see FIG. 3) of the viewer H. At this time, the display device 2 operates as a so-called 3D display device.

(Operation)

In this second embodiment, image light coming from each of the pixels 42 enters the barrier layer 26. Thereafter, the image light is partially shielded by the light-shielding regions 26A of the barrier layer 26, and the remaining light passed through the transmissive regions 26B is emitted from the image display surface of the display panel 50. When the barrier layer 26 is in a mode for dual-view display, for example, the light emitted from the image display surface forms an image at a predetermined position (perspective) on the line segment parallel to the first appropriate-view direction d1, thereby generating 2D image (planar image). Also the light emitted from the image display surface forms an image at a predetermined position (perspective) on the line segment parallel to the second appropriate-view direction d2, thereby generating 2D image (planar image), for example. When the barrier layer 26 is in a mode for 3D display, for example, the light emitted from the image display surface forms an image at the position (perspective) of the right eye e1, thereby generating 2D image (planar image). Also the light emitted from the image display surface forms an image at the position (perspective) of the left eye e2, thereby generating 2D image (planar image), for example. As such, the viewer H is allowed to view 3D image.

(Effect)

In the second embodiment, separately from the barrier layer 26, the adhesive layer 27 as a transparent conductive layer is provided at the upper portion of the panel section 40. This configuration allows to select each suitable material for the barrier layer 26 and for the adhesive layer 27, thereby providing the resistance to corrosion by water to each of the barrier layer 26 and the adhesive layer 27. As an example, in the barrier layer 26, the light-shielding regions 26A may be each made of a resin containing a black pigment or others, the transmissive regions 26B may be each formed like an aperture, and the adhesive layer 27 may be made of an adhesive containing the needle-shaped ITO described above. As such, in this embodiment, since the barrier layer 26 is not configured by a metal thin film that is highly corrosive by water, the resulting display panel 50 favorably becomes both anti-static and resistant to corrosion.

(Modifications)

(Modification 2-1)

Figure 13:
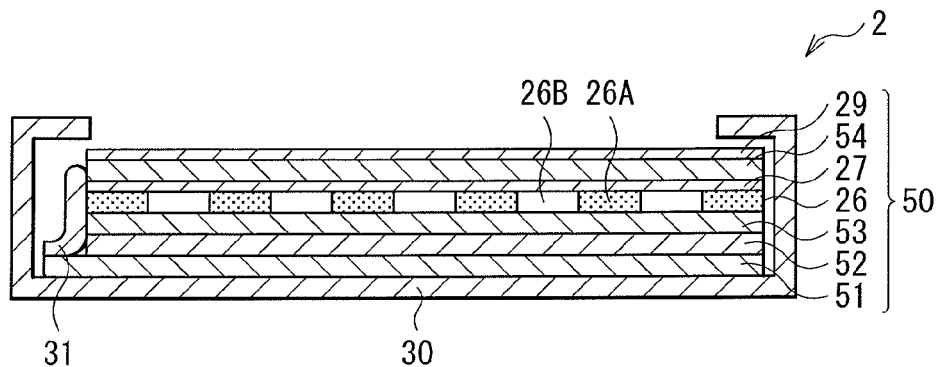
FIG. 13 is a cross-sectional view of the display device of FIG. 12 in Modification 2-1.

In the second embodiment described above, exemplified is the case where the conductor 31 is configured by the pillar-like metal, but alternatively, the conductor 31 may be made of a metal paste, for example. When the conductor 31 is made of a metal paste as such, the conductor 31 may possibly be disposed on the side surface of the display panel 50 as shown in FIG. 13, for example. If this is the configuration, the conductor 31 electrically connects together the end portion of the adhesive layer 27 and the common wiring on the lower substrate 51.

(Modification 2-2)

Figure 14:
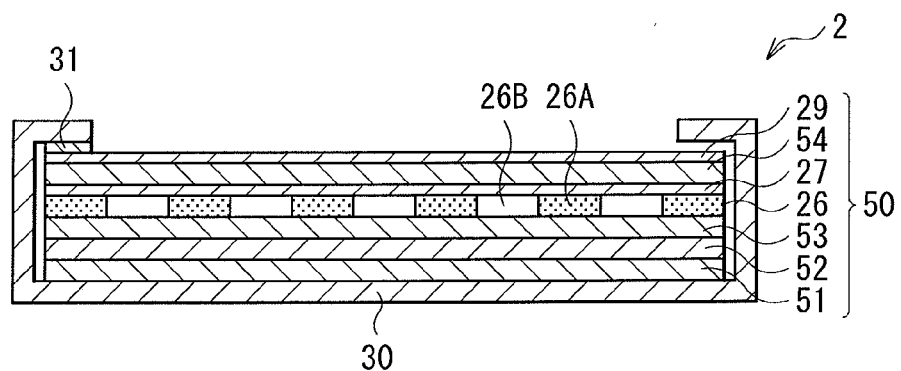
FIG. 14 is a cross-sectional view of the display device of FIG. 12 in Modification 2-2.

In the second embodiment described above, exemplified is the case where the adhesive layer 27 is made conductive, but alternatively, the AR layer 29 may be made conductive, for example. If this is the configuration, as shown in FIG. 14, the conductor 31 is provided on the upper-surface end portion of the display panel 50, i.e., at the upper-surface end portion of the AR layer 29, and electrically connects together the chassis 30 and the AR layer 29. In this case, the conductor 31 may be configured by pillar-like metal, or may be made of a metal paste. This accordingly prevents accumulation of electric charge such as static electricity on the upper substrate 53 side of the display panel 50. Accordingly, similarly to the second embodiment described above, the resulting display panel 50 successfully becomes both anti-static and resistant to corrosion.

(Modification 2-3)

Figure 15:
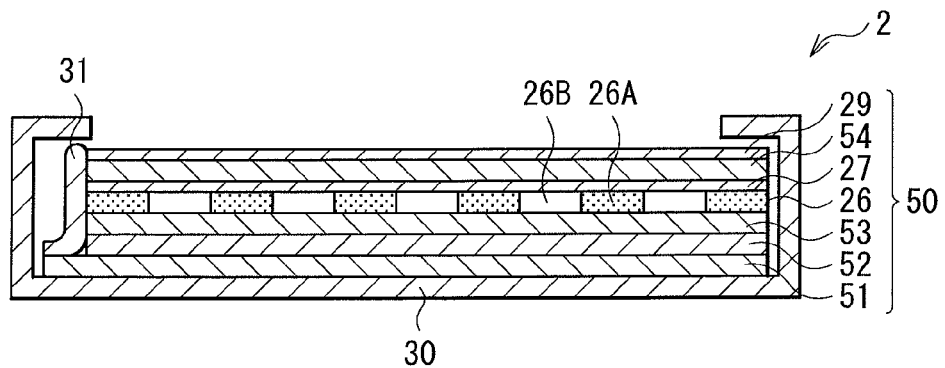
FIG. 15 is a cross-sectional view of the display device of FIG. 12 in Modification 2-3.

In Modification 2-2 described above, exemplified is the case where the conductor 31 is provided at the upper-surface end portion of the display panel 50, but alternatively, the conductor 31 may be provided on the side surface of the display panel 50 as shown in FIG. 15, for example. If this is the configuration, however, the conductor 31 is preferably made of a metal paste.

3. (Application Example)

Figure 16:
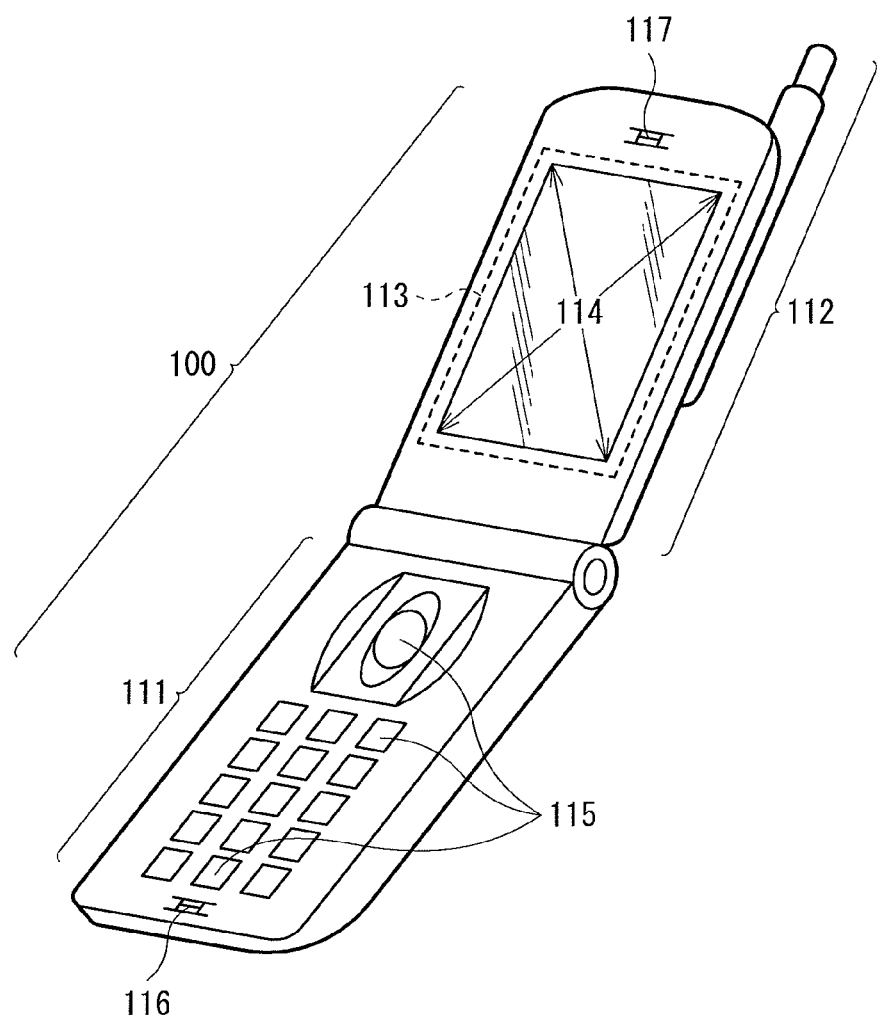
FIG. 16 is a perspective view of an exemplary electronic unit in an application example.

Described next is an application example of the display devices 1 and 2 in the embodiments and modifications described above. FIG. 16 is a perspective view of an electronic unit 100 in this application example, showing an exemplary schematic configuration thereof. The electronic unit 100 is a mobile phone, and is provided with a main body section 111, and a display body section 112, for example. The display body section 112 is provided to be open and close with respect to the main body section 111. The main body section 111 includes operation buttons 115, and a phone mouthpiece section 116. The display body section 112 includes a display device 113, and an earpiece section 117. The display device 113 is so configured as to make various displays related to telephone communications on a display screen 114 thereof. The electronic unit 100 includes a control section (not shown) for controlling the operation of the display device 113. This control section is provided inside of the main body section 111 or in the display body section 112 as a part of the control section in charge of controlling the whole electronic unit 100, or as an individual section separately from the control section.

The display device 113 is in the configuration same as that of the display devices 1 and 2 in the embodiments and modifications described above. This accordingly makes the display panels 20 and 50 both anti-static and resistant to corrosion.

While the present disclosure has been described in detail by referring to the embodiments, the modifications, and the application example, the present disclosure is not restrictive to the embodiment and others described above, and numerous other modifications may be possibly devised.

In the embodiments, and the modifications and the application example thereof described above, exemplified is the case that the light-shielding regions 26A are each made of a light-shielding member, and the transmissive regions 26B are each an aperture. Alternatively, the barrier layer 26 may be in the dynamic configuration, i.e., being controllable the optical characteristics of the light-shielding regions 26A based on a control signal coming from the outside. If this is the configuration, the drive circuit may drive not only the panel section 40 but also the barrier layer 26.

Note that, as an electronic unit applicable with the display devices 1 and 2 in the embodiments and modifications thereof described above, the mobile phone or others described above are surely not restrictive, and examples also include a personal computer, a liquid crystal display television, an image tape recorder of a view finder type or of a direct view type, a car navigation device, an instrument cluster (instrument panel), a pager, an electronic notepad, a calculator, a word processor, a workstation, a picturephone, a POS (Point-Of-Sale) terminal, and others.

It is possible to achieve at least the following configurations from the above-described exemplary embodiments and the modifications of the disclosure.

(1) A display panel, including:
a panel section including a plurality of pixels arranged in a matrix;
a barrier layer provided at an upper or lower part of the panel section, and the barrier layer including light-shielding regions and transmissive regions that are arranged systematically; and
a transparent conductive layer provided at the upper part of the panel section.

(2) The display panel according to (1), further including:
a conductor electrically connecting together the transparent conductive layer and a conductive member.

(3) The display panel according to (2), wherein
the panel section is provided with a first substrate including the conductive member.

(4) The display panel according to (2), wherein
the conductive member is provided on an upper-surface end portion of the display panel.

(5) The display panel according to (1) or (2), wherein
the transparent conductive layer is an adhesive layer.

(6) The display panel according to (5), further including:
a polarizing plate being in contact with the transparent conductive layer, wherein
the panel section includes a liquid crystal layer.

(7) The display panel according to (5), further including:
a transparent substrate being in contact with the transparent conductive layer, wherein
the panel section includes a light-emitting layer.

(8) The display panel according to (1) or (2), further including:
a second substrate between the transparent conductive layer and the panel section, wherein
the transparent conductive layer is an anti-reflection layer.

(9) The display panel according to (8), wherein
the substrate is a polarizing plate.

(10) The display panel according to (8), wherein
the substrate is a transparent substrate.

(11) The display panel according to (1) or (2), wherein
the barrier layer and the transparent conductive layer are resistant to corrosion by water.

(12) The display panel according to (11), wherein
in the barrier layer, the light-shielding region includes a light-shielding member, and the transmissive region is provided as an aperture.

(13) The display panel according to (11), wherein
the barrier layer is allowed to control optical characteristics of the light-shielding region according to a control signal coming from an outside.

(14) A display device including a display panel and a chassis supporting the display panel, the display panel including:
a panel section including a plurality of pixels arranged in a matrix;
a barrier layer provided at an upper or lower part of the panel section, and the barrier layer including light-shielding regions and transmissive regions that are arranged systematically; and
a transparent conductive layer provided at the upper part of the panel section.

(15) An electronic unit with a display device, the display device including a display panel and a chassis supporting the display panel, the display panel including:
a panel section including a plurality of pixels arranged in a matrix;
a barrier layer provided at an upper or lower part of the panel section, and the barrier layer including light-shielding regions and transmissive regions that are arranged systematically; and
a transparent conductive layer provided at the upper part of the panel section.

The present disclosure contains subject matter related to that disclosed in Japanese Priority Patent Application JP 2011-87914 filed in the Japan Patent Office on Apr. 12, 2011, the entire content of which is hereby incorporated by reference.

It should be understood by those skilled in the art that various modifications, combinations, sub-combinations and alternations may occur depending on design requirements and other factors insofar as they are within the scope of the appended claims or the equivalents thereof.

What is claimed is:

1. A display panel, comprising:
   a panel section including a plurality of pixels arranged in a matrix;
   a barrier layer provided at an upper or lower part of the panel section, the barrier layer including light-shielding regions and transmissive regions in a systematic arrangement; and
   a transparent conductive layer provided at the upper part of the panel section,
   wherein,
   the transparent conductive layer is an adhesive layer.

2. The display panel according to claim 1, further comprising a conductor electrically connecting together the transparent conductive layer and a conductive member.

3. The display panel according to claim 2, wherein the panel section is provided with a first substrate including the conductive member.

4. The display panel according to claim 2, wherein the conductive member is provided on an upper-surface end portion of the display panel.

5. The display panel according to claim 1, further comprising a polarizing plate in contact with the transparent conductive layer, wherein the panel section includes a liquid crystal layer.

6. The display panel according to claim 1, further comprising a transparent substrate in contact with the transparent conductive layer, wherein the panel section includes a light-emitting layer.

7. The display panel according to claim 1, further comprising:
   a substrate between the transparent conductive layer and the panel section, wherein the transparent conductive layer is an anti-reflection layer.

8. The display panel according to claim 7, wherein the substrate is a polarizing plate.

9. The display panel according to claim 7, wherein the substrate is a transparent substrate.

10. The display panel according to claim 1, wherein the barrier layer and the transparent conductive layer are resistant to corrosion by water.

11. The display panel according to claim 10, wherein in the barrier layer, the light-shielding region includes a light-shielding member, and the transmissive region is provided as an aperture.

12. The display panel according to claim 10, wherein the barrier layer is allowed to control optical characteristics of the light-shielding region according to a control signal coming from an outside.

13. A display device including a display panel and a chassis supporting the display panel, the display panel comprising:
   a panel section including a plurality of pixels arranged in a matrix;
   a barrier layer provided at an upper or lower part of the panel section, the barrier layer including light-shielding regions and transmissive regions in a systematic arrangement; and
   a transparent conductive layer provided at the upper part of the panel section,
   wherein,
   the transparent conductive layer is an adhesive layer.

14. An electronic unit with a display device, the display device including a display panel and a chassis supporting the display panel, the display panel comprising:
   a panel section including a plurality of pixels arranged in a matrix;
   a barrier layer provided at an upper or lower part of the panel section, the barrier layer including light-shielding regions and transmissive regions in a systematic arrangement; and
   a transparent conductive layer provided at the upper part of the panel section,
   wherein,
   the transparent conductive layer is an adhesive layer.

15. A display panel, comprising:
   a panel section including a plurality of pixels arranged in a matrix;
   a barrier layer provided at an upper or lower part of the panel section, the barrier layer including light-shielding regions and transmissive regions in a systematic arrangement; and
   a transparent conductive layer provided at the upper part of the panel section,
   wherein,
   the barrier layer and the transparent conductive layer are resistant to corrosion by water.

16. A display device including a display panel and a chassis supporting the display panel, the display panel comprising:
   a panel section including a plurality of pixels arranged in a matrix;
   a barrier layer provided at an upper or lower part of the panel section, the barrier layer including light-shielding regions and transmissive regions in a systematic arrangement; and
   a transparent conductive layer provided at the upper part of the panel section,
   wherein,
   the barrier layer and the transparent conductive layer are resistant to corrosion by water.

17. An electronic unit with a display device, the display device including a display panel and a chassis supporting the display panel, the display panel comprising:
   a panel section including a plurality of pixels arranged in a matrix;
   a barrier layer provided at an upper or lower part of the panel section, the barrier layer including light-shielding regions and transmissive regions in a systematic arrangement; and
   a transparent conductive layer provided an the upper part of the panel section,
   wherein,
   the barrier layer and the transparent conductive layer are resistant to corrosion by water.

* * * * *